United States Patent
Fischer et al.

(12) 
(10) Patent No.: US 6,382,020 B1
(45) Date of Patent: *May 7, 2002

(54) APPARATUS FOR TESTING AUTOMOTIVE WHEELS AND PARTS THEREOF ESPECIALLY MOTORCYCLE WHEELS

(75) Inventors: Gerhard Fischer, Darmstadt; Vatroslav Grubisic, Reinheim; Jürgen Klock, Otzberg, all of (DE)

(73) Assignee: Fraunhofer-Gesellschaft zur Forderung der Angewandten Forschung E.V. (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/225,761

(22) Filed: Jan. 5, 1999

(30) Foreign Application Priority Data

Jan. 7, 1998 (DE) .......................... 198 00 350

(51) Int. Cl.[7] ............................... G01M 17/02

(52) U.S. Cl. .......................... 73/146; 73/862

(58) Field of Search ............... 73/146, 146.2, 73/147, 148

(56) References Cited

U.S. PATENT DOCUMENTS 4,475,383 A * 10/1984 Fischer et al. ................. 73/146
6,116,084 A * 8/2000 Fischer et al. ................. 73/146

FOREIGN PATENT DOCUMENTS

DE  33 41 721   11/1983
EP  0 063 245   3/1982

* cited by examiner

Primary Examiner—Bejamin R. Fuller
Assistant Examiner—Andre Allen
(74) Attorney, Agent, or Firm—Howrey Simon Arnold & White

(57) ABSTRACT

The invention provides a device for testing motor vehicle wheels, tires, wheel hubs, wheel bearings, and wheel bolts under loading conditions similar to operating conditions, including a mounting device for pivoting attachment of a vehicle wheel; a drum arranged around the vehicle wheel in such a way that the vehicle wheel can be brought into rolling contact with the inner circumferential surface of the drum; a vertical or radial loading device which, in order to apply a vertical or radial force acting in the vertical or radial direction of the vehicle wheel onto the mounting device, is connected with the latter; a lateral or axial loading device for applying a lateral or axial force acting in the lateral or axial direction of the vehicle wheel, in order to apply the lateral or axial force onto the mounting device, the lateral or axial loading device being connected with the mounting device; at least one ring located on the inner circumferential surface of the drum, which ring is arranged as a thrust ring adjacent to the tire and the side of the vehicle wheel and is beveled on the side turned toward the tire; and a device for turning the drum; the mounting device including a mount for at least one motorcycle wheel as a vehicle wheel with mounting of the motorcycle wheel on one of two ends of the axle of the same and one-sided attachment of the mount on the remaining part of mounting device.

6 Claims, 3 Drawing Sheets

APPARATUS FOR TESTING AUTOMOTIVE WHEELS AND PARTS THEREOF ESPECIALLY MOTORCYCLE WHEELS

BACKGROUND OF THE INVENTION

The invention concerns a device for testing motor vehicle wheels, tires, wheel hubs, wheel bearings, and wheel bolts under loading conditions similar to operating conditions, including (a) a mounting device for pivoting attachment of a vehicle wheel and for swiveling the same in different camber angles;

(b) a drum located around the vehicle wheel in such a way that the vehicle wheel can be brought into rolling contact with the inner circumferential surface of the drum via a tire located on the wheel;

(c) a vertical or radial loading device which, in order to apply a vertical or radial force acting in the vertical or radial direction of the vehicle wheel onto the mounting device, is connected with the latter;

(d) a lateral or axial loading device for applying a lateral or axial force acting in the lateral or axial direction of the vehicle wheel, in order to apply the lateral or axial force onto the mounting device, the lateral or axial loading device being connected with the mounting device;

(e) at least one ring located on the inner circumferential surface of the drum, which ring is arranged as a thrust ring adjacent to the tire and the side of the vehicle wheel and is beveled on the side tuned toward the tire; and (f) a device for turning the drum;

(g) the vertical or radial loading device and the lateral or axial loading device each being connectively hinged with the mounting device;

The former fatigue strength investigation methods for motorcycle wheels are, above all, the following:

(1) roll testing under pure vertical force;
(2) torsion testing with clamping of the rim; and
(3) driving test with motorcycles;

The disadvantages of these above-mentioned testing methods are, both with respect to conducting them as well as the application thereof, in particular the following:

(i) In the case of rolling testing under pure vertical force, and in the case of torsion testing with clamping of the rim, none of the deformation corresponding to actual driving practice is created, so that these testing methods provide only partial results, the evaluation of which is complicated and problematical for practical application.

(ii) In the case of the driving tests with motorcycles there is no sufficient reproducibility of the stress, so that the driving tests are only conditionally usable for the construction of motorcycles, in addition the test driver, in particular in the case of extreme loads in the driving tests, is exposed to significant dangers.

(iii) Finally, in the case of application of the above-mentioned testing methods, tedious, time- and cost-consuming tests of the motorcycle wheels are required which, on the one hand, lead to a corresponding increase in the final sales costs of the motorcycles and, on the other hand, to a relatively long development time for new motorcycle models.

SUMMARY OF THE INVENTION

The object of the invention is, in particular, to make available a device for testing motorcycle wheels, which makes it possible to test under loading conditions close to operating conditions with reproducibility of the stress and with reduced expenditure of time and costs, so that the results of the tests conducted with this device can be transferred to the practice of motorcycle production relatively reliably and without complications, without the tests being relatively tedious as well as time- and cost-consuming.

This object is solved with a device of the type mentioned initially, from the applicant's European patent 63 245 and U.S. Pat. No. 4,475,383 and, in a modified form which does not possess the last feature of the features (a) to (g) of the features mentioned initially, from DE 33 41 7212 C2, in that (1) the mounting device is mounted capable of moving in such a way that the vehicle wheel can be pivoted around the wheel contact point for automatic camber adjustment; and (2) the mounting device includes a mount for at least one motorcycle wheel as a vehicle wheel with one-sided attachment of the mount on the remaining part of the mounting device.

In a preferred embodiment of the device in accordance with the invention, the mount for the motorcycle wheel is attached via a flexible bearing to the remaining part of the mounting device, therefore the loading structure.

An attachment arrangement for a brake, in particular a disk brake, designed for the motorcycle wheel, in or on the mount, so that braking forces and acceleration forces can be applied via the brake, in particular the disk brake, with corresponding direction of rotation of the drum simultaneously with the vertical forces and lateral forces acting via the mounting device, therefore force combinations, as they appear in the actual driving operation of a motorcycle.

As compared with vehicle wheels for automobiles and utility vehicles, the diameter of the drum is chosen so that it is significantly larger than that of the motorcycle wheel, preferably 1.2 to 2.5 times as large as the diameter of the motorcycle wheel, so that a loading of the motorcycle wheel similar to operating conditions is provided at the wheel contact point.

The form of the thrust ring or of the two thrust rings, which in accordance with the invention preferably is designed so that it is adapted in a particular and optimal way to the conditions of motor vehicle wheel tires for serviceability tests with the least possible wear, by the thrust ring having:

(a) an early, relatively steep leading edge,
(b) a flat middle edge opposite this,
(c) a relatively steep end edge, and
(d) a rounding on the inner projection.

Finally, the device is designed according to the invention so that an inner drum is provided for strength testing of an original brake by simulation of braking forces with relatively large angle of grip.

The preceding, as well as further advantages and features of the invention are described and explained below by means of a particularly preferred embodiment of the device in accordance with the invention presented in the figures.

DETAILED DESCRIPTION OF THE PREFERRED EMBODIMENTS

Figure 1:
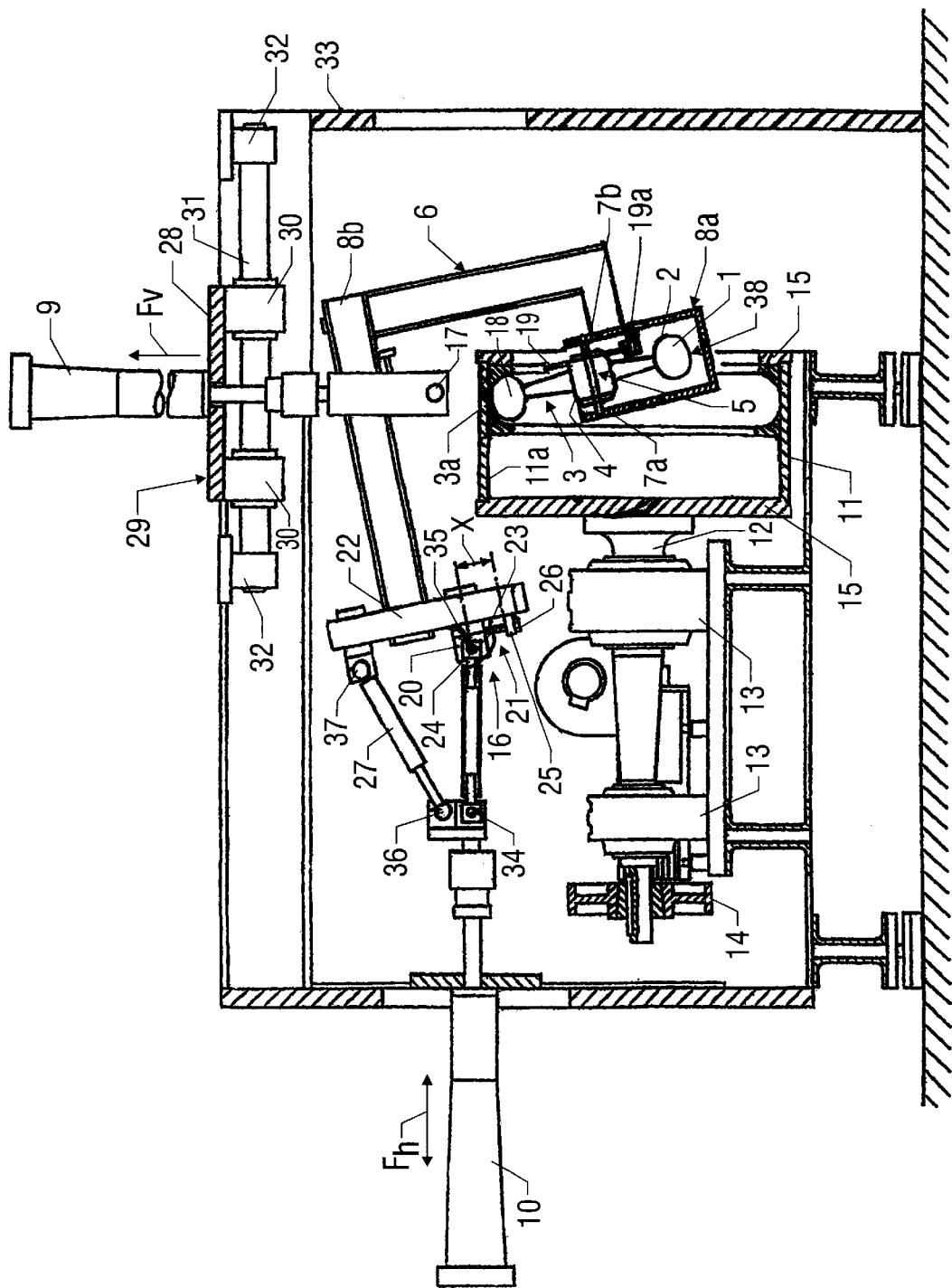
FIG. 1 shows a schematic view of a preferred embodiment of the device in accordance with the invention shown partially in the section.

Reference is made first to FIG. 1, which shows an embodiment of a device for testing vehicle wheels, in particular motorcycle wheels, wheel hubs, wheel bearings and/or wheel bolts under loading conditions similar to operating conditions, which has the following, including objects to be checked: A tire 1, which is mounted on the rim 2 of a motorcycle wheel 3 and is pumped up with rated air pressure or increased air pressure. In order to attach the motorcycle wheel 3 and for receiving the wheel forces, a wheel hub 4 is provided with wheel bearings 5. In the case of the wheel hub 4 it can be a matter of an over-dimensioned test hub, if, for example, the motorcycle wheel 3, or, as the case may be, the tire 1 is to be tested or in the case of an original hub it can be a matter of an original hub with the associated original motorcycle bearing, if the wheel hub and/or the motorcycle bearing is to be tested. The transfer of the introduced quasi-static forces into the rotating motorcycle wheel 3 takes place via the wheel bearing 5 and the axle or axles 7 and axle ends 7a, 7b, by means of which the ends of the axle 7 of the motorcycle wheel 3 are attached to the mount 8a.

Furthermore in accordance with FIG. 1 the device has a loading transfer structure 8b, in particular in the form of a loading bracket 8b, which together with the mount 8a forms a mounting device 6 for swiveling the swivel-mounted motorcycle wheel 3 around the wheel contact point thereof 3a. A vertical or radial force and a lateral or axial force are introduced into the motorcycle wheel 3 via this loading bracket 8b, the mount 8a, the wheel axle 7, and the wheel bearing 5, the wheel hub 4, etc., and so that the reaction forces arising on the tire 1 are reduced at a defined wheel contact point 3a. A vertical or radial loading device 9, which is designed at present as a servo-hydraulic cylinder, is provided for using a vertical or radial force $F_v$ which is constant or at different levels operating in the radial direction of the motorcycle wheel 3. Further a lateral or axial loading device 10, which at present also is designed as a servo-hydraulic cylinder, is present for using a lateral or axial force $F_h$ acting constant or at different levels in the axial direction of the motorcycle wheel 3, which at present also is made as a servo-hydraulic cylinder.

Since the designation "vertical force" $F_v$ and "radial force" as well as the designations "lateral force" $F_h$ and "axial force" are synonyms, in each case only one or the other of the two designations is used below.

Finally, a drum 11 located around the motorcycle wheel 3 is provided so that the motorcycle wheel 3 can be brought into rolling contact with the inner circumferential surface 11a of the drum 11 over the tire 1 located thereupon. For example, the drum 11 consists of a base plate, a drum body and a cover and has two thrust rings 15. In this drum 11, in which the motorcycle wheel 3 rolls, the axial reaction force and the radial reaction force are transferred at the wheel contact point 3a, or, as the case may be, in the wheel contact surface in the tire 1. The inner diameter of the drum body is significantly greater that the tire diameter.

In addition, there is provided a device for turning the drum 11, which includes a drive shaft 12 for attaching the drum 11, bearing 13 for mounting the drive shaft 12 and for receiving the radial and axial reaction forces, a drive motor not shown for driving the drive shaft 12 via a V-belt drive 14 and thus for driving the drum 11 and the vehicle wheel 3, as well as for braking the drive shaft 12, the drum 11, and the vehicle wheel 3.

The coupling of the vertical or radial loading device 9 and the lateral or axial loading device 10 to the mounting device 6 and, in connection therewith, the mode of operation of the previously described device for testing vehicle wheels, in particular motorcycle wheels, wheel hubs, wheel bearings, and wheel bolts under loading conditions similar to operating conditions now are to be explained in greater detail (see FIG. 1 and partially also FIG. 2).

The testing of vehicle wheels, or, as the case may be, motorcycle wheels 3, wheel hubs 4, wheel bolts and/or wheel bearings 5, in conditions similar to operating conditions, is performed with the introduction of the wheel forces appearing in operation via the tire 1 into the rotating motorcycle wheel 3. In the case of the wheel forces acting on the tire 1, it may be a matter of radial forces $F_v$, positive axial forces $+F_h$, negative axial forces $-F_h$, as well as tangential forces $F_A$, $F_B$, that is, drive forces $F_A$, and braking forces $F_B$, as well as combinations hereof.

Next, the generation of radial forces acting in the radial direction of the motorcycle wheel 3 are to be described.

Radial forces acting on the motorcycle wheel 3 arise in operation in the case of driving in a straight ahead direction, it being possible for these radial forces to act at different heights depending on the driving conditions, in the case of which, for example, it can be a matter of driving (simulated in the testing operation) on roads of different roughness, over potholes, frost heaves, railroad tracks, etc., as well as in the case of driving in a curve as a result of the weight displacement. The radial reaction forces acting on the motorcycle wheel 3 are generated when a tensile force is introduced into the loading bracket 8b as a radial force $F_v$ acting on the motorcycle wheel 3, and the motorcycle wheel 3 is supported with respect to the tire 1 on the rotating drum 11. By means of the deformation, namely the collapsing of the tire 1 under the radial reaction force, a wheel contact point 3 or a wheel contact line or surface, which here are to be covered by the term "wheel contact point", arises, that is, the reaction force is introduced over a definite area over the tire circumference and the tire width. A prerequisite for creating purely radial reaction forces in the motorcycle wheel 3 is the introduction of the mentioned tensile force by means of the radial loading device 9 in the middle of the wheel.

For this the vertical or radial loading device 9 is mounted on a base 28, for example, a plate, and this base 28 can be moved freely, or, as the case may be, slide freely, parallel to the inner working surface 11a of the drum 11, so that the vertical or radial loading device 9 follows the motorcycle wheel 3 by itself in the case of lateral displacements in the drum 11 and the vertical or radial force $F_v$ always is introduced or transferred in the wheel contact point 3a. In addition, adaptation for each tire width is possible by means of the movably provided introduction of the vertical or radial force into the loading bracket 8b, or, as the case may be, the mounting device 6.

At present the displacement guide 29 on the base includes attached guide sleeves or sliding bearings 30, which can be slid on a guide rod 31 or several parallel guide rods, which for their part is, or, as the case may be, are, mounted fixed via mounts 32, e.g. on the frame 33 of the test device. However, this is only one embodiment since the displacement guide 29 can be made in very different ways in order to assure the above mode of operation.

The creation of axial forces $F_h$ acting in the axial direction of the motorcycle wheel 3 are explained next.

Axial forces $F_h$ arise in the operation of a vehicle in the case of travel in a curved line with force components directed toward the middle of the vehicle, therefore positive axial force $+F_h$ on the outer edge of the curve and in the case of travel in the direction straight ahead via irregularities in the path of travel, for example potholes, by means of which the direction of force can be directed both to the middle of the vehicle, which corresponds to a positive axial force $+F_h$, as well as for the outside of the vehicle, which corresponds to a negative axial force $-F_h$. In the vehicle operation axial forces can appear only in combination with radial forces as load combinations. In the present device the axial forces $F_h$ acting on the motorcycle wheel 3 are generated as reaction forces by means of the axial loading device 10, which is designed as a servo-hydraulic cylinder.

A positive axial reaction force is produced in the case of the given radial reaction force by a tensile force on the axial loading device as a reaction force by means of the support of the tire 1 on the sloping surface of the thrust ring 15. The tensile force on the axial loading device 10 is introduced at the level of the inner working surface 11a of the drum body 11 in the wheel contact point 3a, the axial reaction force on the tire 1 resulting over a limited area of the circumference of the tire. By means of the introduction of the axial force at the level of the wheel contact point 3a, lever arm relations identical to operating conditions are ensured. A negative axial reaction force is generated in the case of the given radial reaction force by means of a pressure force on the axial loading device 10, by means of which the axial reaction force on the motorcycle wheel 3 arises as a result of the tire 1 running on the outer thrust ring 15.

The thrust rings 15 are arranged capable of moving in the drum bodies 11, so that an adaptation to any tire widths or, as the case may be, vehicle wheel sizes is possible, which is to be preferred because of a limited cylinder path of the servo-hydraulic cylinder forming the axial loading device 10.

Basically, any ratio between axial and radial reaction force can be achieved by the introduction of the axial reaction forces via the thrust rings 15 with the present device by means of the interlocking produced herewith.

The control of the radial loading device 9 and the axial loading device 10 takes place independent of one another, so that each desired loading combination, consisting of radial forces $F_v$ and positive axial forces $+F_h$ as well as negative axial forces $-F_h$ can be adjusted. In this way a simulation of all loading cases appearing in operation, similar to operation, irregular, or statistical in nature.

As described above, the swiveling of the mounting device 6, or, as the case may be, the loading bracket 8b around the pivot axis 17, which is parallel to the wheel contact surface, or, as the case may be, to the inner working surface 11a and perpendicular to the wheel axis 7, and via which the mounting device 6, or, as the case may be, the loading bracket 8b is hinged with the vertical or radial loading device 9, is essential for the swiveling of the motorcycle wheel 3 around the wheel contact point 3a taking place in the device in accordance with the invention in connection with the free or independent mobility of the vertical or radial loading device 9 and the mounting device 9 provided in accordance with the invention with the latter.

Since the swiveling of the vehicle wheel 3 around the wheel contact point 3a, or, as the case may be, the wheel contact surface, that is, around a virtual axis, which is parallel to the pivot axis 17 and perpendicular to the direction of motion given by the displacement device 29, is made possible by the free displacement of the mounting device 6, or, as the case may be, the loading bracket 8b around the pivot axis 17. Since if the motorcycle, wheel 3 swivels around the wheel contact point 3a in the sense of a camber angle change, at the same time (a) the mounting device 6 together with the vertical or radial loading device 9 moves along the displacement guide 29, and (b) the mounting device 6 moves around the pivot axis 17.

In order that the vertical or radial loading device 9 be freely movable together with the mounting device 6, it is provided that the vertical or radial force $F_v$ always be applied or, as the case may be, transferred in the wheel contact point 3a also in the case of lateral displacement, or, as the case may be, wandering of the motorcycle wheel 3 to the one or the other of the two thrust rings 15.

An embodiment of the invention, "inferior" to this, which operates satisfactorily which the position of the wheel contact point 3a would be attached in the axial direction of the drum 11, consists in the fact that the mounting device 6 can be turned along a—not shown—linear displacement guide, which is freely movable, capable of turning around the pivot axis 17. In this way also it was possible for the motorcycle wheel 3 to pivot around the wheel contact point 3a in the sense of a camber angle adjustment, while the vertical or radial loading device 9 remains fixed. Then in order to be able to adjust the wheel contact point 3a parallel to the axis of the drum 11, the vertical or radial loading device 9 would have to be adjustable in the sense of the displacement bearing 29.

The structure adjusting device 16 for preliminary adjustment of the camber angle of the motorcycle wheel 3 in such a way that the camber is limited to a predetermined maximum camber angle, but smaller camber angles (intermediate size) corresponding to the ratio of the axial and radial force are adjusted by themselves, is now described.

In general, the adjusting device 16 at present is a limiting device for limiting the maximum camber angle and thus the pivot angle of the mounting device 6 around the pivot axis 17 perpendicular to the wheel axis 7 and parallel to the wheel contact surface 18, or, as the case may be, inner working surface 11a of the drum 11. The adjusting device 16 includes a positioning or locking device 21 for a contact element 20 of the lateral or axial loading device 10, via which the latter acts on the mounting device 6 for generating a moment around the pivot axis itself.

At present the contact element 20 is a sliding element, which can move on an arm 22 on the mounting device 6 capable of turning around the pivot axis 17, and the positioning or locking device 21 is an adjustable stop 23 for the sliding element 20, limiting the maximum effective length of the arm 22, the stop 23 having the form of a threaded bolt 24, which is adjustable parallel to the arm 22 in a nut 25 attached tightly to the arm 22, and which can be locked by a locknut 26.

However, the adjusting device 16 can be made as, for example a hydraulically or electrically adjustable positioning and locking device, therefore as a remote-adjustable adjusting device.

At present the adjusting device 16 is a device for adjusting the moment, which is exerted by the lateral or axial loading device 10, if the force settings thereof on the swivel-mounted mounting device 6 is unchanged since the limitation of the maximum camber angle is made by a preliminary adjustment of the lateral force introduction, for example mechanically, electrically, or hydraulically. A smaller moment is generated by $F_h$ and camber angle is reduced by increasing the separation X. In the case of all intermediate values of $F_h$, or, as the case may be, $F_v$ a reduced camber angle follows analogously.

After successful preliminary adjustment, all intermediate values of the camber angle are adjusted corresponding to the level of the force $F_v$, $F_h$ and the kinematics. As a result of this a hydraulic cylinder for camber adjustment and the associated complicated control of the same can be dispensed with here.

This represents an essential improvement also with respect to devices with the generation of additional control values of the camber angle via hydraulic cylinders. These have to be programmed constantly in each loading stage and do not follow the simple characteristic line. In this case expensive driving operation measurements are required preliminarily in order to be able to derive the correct camber control signals. In addition, a hydraulic camber control cylinder makes the test device and the test costs considerably more expensive.

Furthermore, a damping device 27 for damping the motion of the mounting device 6 is located between the arm 22 of the mounting device 6 and the lateral or axial loading device 10.

The lateral or axial loading device 10 and the damping device 27 are connected with the arm 22 via hinges 34, 35, 36, and 37.

For example a 4-channel control program, which simulates the standard load cases including driving in a curved and straight forward direction, can serve for controlling the present wheel test stand with the incorporation of brake and drive forces.

Figure 2B:
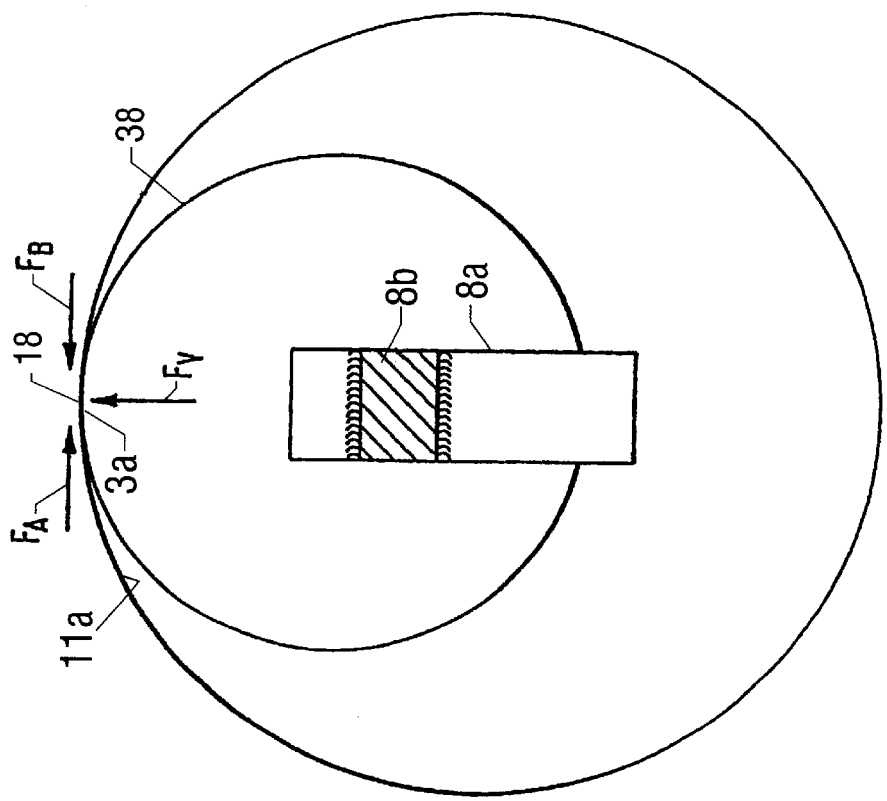
FIG. 2B shows a representation of the rolling motion of the motorcycle wheel on the inner surface of the drum in a plane perpendicular to the drawing plane of FIG. 1, the forces acting in this plane being indicated by arrows.
Figure 2A:
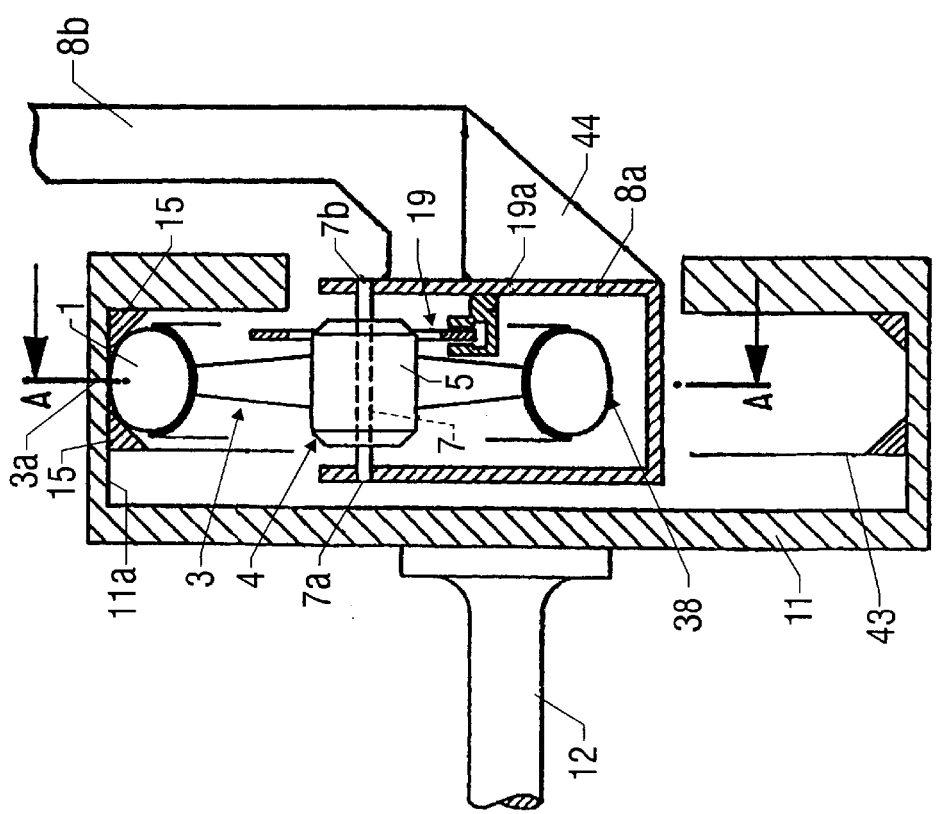
FIG. 2A shows a side view of the part of the embodiment of FIG. 1 of the device in accordance with the invention particularly important for the attachment of a motorcycle wheel.

FIG. 2A shows in an enlarged partial view of FIG. 1 the mount 8a with its connection with the loading transfer structure 8b, which is made in the present preferred embodiment as a loading bracket. A disk brake 19, which preferably is an original disk brake of a motorcycle, which is mounted on the mount 8a via an attachment device 19a, preferably is provided on the motorcycle wheel 3.

A structure (not shown) capable of vibrating actively or passively can be mounted between the loading bracket 8b and the mount 8a, by means of which the motorcycle wheel 3 can be made to vibrate; so that vibrations appearing in practical driving operation are simulated. 44 designates a reinforcement which is omitted in FIG. 1.

The inner circumferential surface 11a of the drum 11 and the outer rolling surface 38 of the tire 1 as well as the forces generated in the wheel contact point 3a in the plane of the drawing of FIG. 2A are schematically indicated in FIG. 2B in a schematic section through the device of FIG. 2A along the line A—A, namely the drive force $F_A$, the breaking force $F_B$, which can be applied by reversal of the direction of turning of the drum 11, as well as accelerating force, and the vertical force $F_V$. In addition, the above-mentioned lateral forces $F_h$ act on the tire 1 perpendicular to the drawing plane of FIG. 2A.

Figure 3:
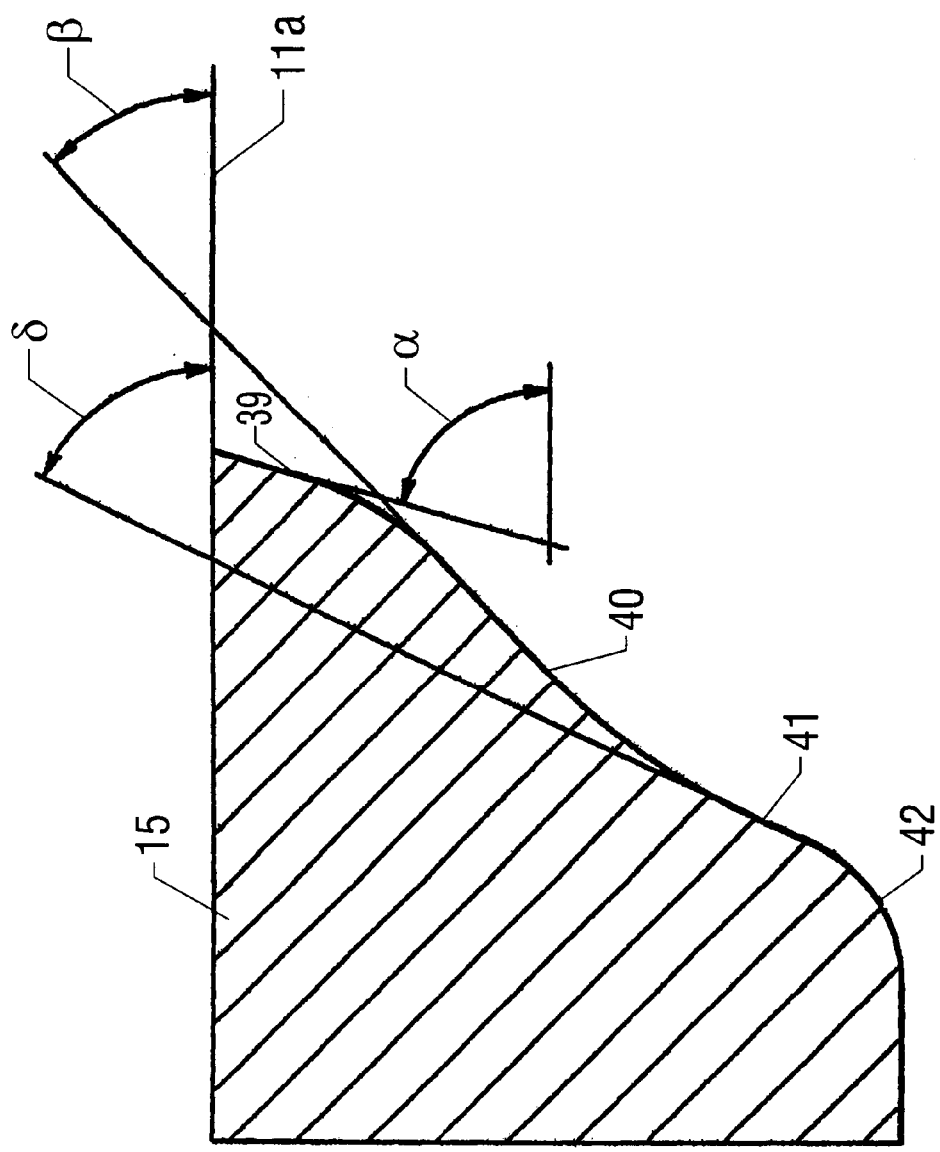
FIG. 3 shows a cross-section through the upper part of the left thrust ring in FIG. 2A for illustrating the special form of such a thrust ring preferably provided in the invention.

FIG. 3 shows a cross-sectional form of a preferred embodiment of a thrust ring 15, and indeed at present of the left upper cross-section in FIGS. 1 and 2A, which naturally also obtains for the right, upper and left and right lower cross-section in FIG. 1. This cross-section has a form in accordance with the invention such that it is optimally adapted to the conditions of motorcycle wheel tires for serviceability investigations with the least possible wear, by having the cross-section of this thrust ring 15 as follows:

(a) an early leading edge 39 with a relatively steep leading angle α, (b) a middle edge 40 with a relatively flat leading angle β, (c) an end edge 41 with a relatively steep leading angle δ, and (d) a rounding on the inner projection 42.

The size of the angles α, β, and δ depends in particular on the tire height and shape as well as width and the tire diameter and profile as well as the radial and axial rigidity of the tire.

An inner drum 43 is provided in FIG. 2A for strength testing of an original brake by simulation of the braking forces $F_B$ with relatively larger angle of grip.

Examples of loading programs, with which very different loading sections can be carried out in different sequences and lengths of very different motorcycle wheels, which can be carried out with the device in accordance with the invention, are cited in the following "Loading Program" Table. In this table the vertical or radial force $F_v$ is designated as "vertical force $F_{z,\,i}$", while the lateral or axial force $F_h$ is designated as "lateral force $F_{y,\,i}$" and the braking or acceleration force $F_B$ is designated as "longitudinal force $F_{x,\,i}$", in which designations x, y, and z are the coordinate direction of these forces in a corresponding Cartesian coordinate system, and i designates the effect of this force, namely static or dynamic.

| | Loading program | | | | | | | |
|---|---|---|---|---|---|---|---|---|
| Maximum value of the wheel forces | I driving straight ahead $G_1$ | II brakes $B_1$ | III driving straight ahead $G_2$ | IV driving in curve $K_1$ | V driving straight ahead $G_3$ | VI brakes $B_2$ | VII driving straight ahead $G_4$ | VIII driving in curve $K_2$ |
| vertical force $F_{z,,i}$ | $F_{z,\,stat} + 2\,C_R$ | $F_{z,\,stat} + G\,h/l^{1)}$ (rear wheel = 0) | $F_{z,\,stat} + 2\,C_R$ | $1.2 \cdot F_{z,\,stat}$ | $F_{z,\,stat} + 2\,C_R$ | $F_{z,\,stat} + 2\,C_R$ | 80% of I | as IV |
| lateral force $F_{y,i}$ | — | — | $+0.2\,F_{z,\,stat}$ | $1.2 \cdot F_{z,\,stat}$ (camber + 45°) | — | $-0.2\,F_{z,\,stat}$ | — | as IV (camber − 45°) |
| longitudinal force $F_{x,,i}$ | — | $F_{z,\,stat} + G\,h/l_{1)}$ | — | — | — | $F_{z,\,stat} + G\,h/l$ or 0 (rear wheel) | — | — |

-continued

Loading program

| Maximum value of the wheel forces | I driving straight ahead $G_1$ | II brakes $B_1$ | III driving straight ahead $G_2$ | IV driving in curve $K_1$ | V driving straight ahead $G_3$ | VI brakes $B_2$ | VII driving straight ahead $G_4$ | VIII driving in curve $K_2$ |
|---|---|---|---|---|---|---|---|---|
| partial collective $S_i$ | $S_1$ | $S_2$ | $S_3$ | $S_4$ | $S_5$ | $S_6$ | $S_7$ | $S_8$ |

[1] only to be taken for the front wheel

Explanation:
$F_{z, stat}$ = static wheel load (form intrinsic weight and payload)
$C_R$ = tire spring hardness in N/cm
G = total weight in N
h = height of center of gravity in cm
l = wheel base in cm
$S_i$ = frequency distribution of the loading forces (composite density) in individual sections
$F_i$ = forces in N The device in accordance with the invention for testing motorcycle wheels under loading conditions similar to operating conditions, in particular has the following features and application possibilities, briefly summarized in a particularly preferred embodiment:

(1) the device possesses a mounting device for motorcycle wheels with enclosing attachment on both ends of the axle, in particular for standard wheels, and attachment on one side for corresponding swivel mounting.

(2) The device possesses an attachment arrangement for a disk brake.

(3) As compared with a corresponding device for testing motor vehicle wheels the device has an enlarged drum diameter for ensuring a loading similar to operating conditions at the wheel contact point (4) The thrust ring is adjusted to the conditions of motorcycle tires in such a way that the durability tests can be performed with the least possible wear, and the thrust ring has an early, steep leading edges, a flatter middle side, and a steep end edge as well as a rounding on the inner projection.

(5) The device makes a simulation of braking forces $F_B$ and acceleration forces (drive) $F_A$ over the same disk brake, but with reversed direction of rotation of the drum possible. These braking forces and/or acceleration forces are superimposed on the vertical forces $F_v$ and the lateral forces $F_s$, which cannot be simulated in the known simplified devices in accordance with the prior art.

(6) The loading data for the device are adjustable with the incorporation of specific conditions of use of the motorcycle wheels.

(7) In the device a strength analysis or durabiltiy testing of original brakes by simulation of the extreme braking forces due to the greater angle of grip in an inner drum can also be carried out Particularly important differences of the device in accordance with the invention for testing motorcycle wheels as compared with the device as is described in European patent specification 63 245 and U.S. Pat. No. 4,475,383 as well as German patent specification 3 341 721, in the case of particularly preferred embodiments of the invention, in particular are the following:

(a) The device in accordance with the invention has a greater diameter and a narrower construction as compared with the device for motor vehicle wheels.

(b) In the device in accordance with the invention, in most cases, that is with the exception of motorcycle wheels, which have a one-sided axle mounting in the original motorcycle and naturally also are so tested, the mount acts on both sides of the axle, and, as opposed to this, the above-mentioned device in the case of wheels of passenger automobiles and utility vehicles acts on one side on the wheel axle.

(c) In the device in accordance with the invention, an additional loading by brakes and accelerations is possible, which processes generate the essential portion of the stresses on the wheel spokes being the critical area of a motor cycle wheel; the simulation of these loadings with a brake can be performed in the case of optional reversal of direction of rotation of the drum.

(d) Different tire forms which require another drum and thrust ring shape in each case can be tested with the device in accordance with the invention.

(e) New loading programs can be carried out with the device in accordance with the invention, as the table given above shows.

What is claimed is:

1. A device for testing motor vehicle wheels (3), tires (1), wheel hubs (4), wheel bearings (5), and/or wheel bolts under loading conditions similar to operating conditions, said wheels having a wheel contact point, comprising:

(a) a mounting device (6) for pivoting attachment of a vehicle wheel (3) and for swiveling the wheel in different camber angles;

(b) a drum (11) having a diameter and an inner circumferential surface (11a) arranged around the vehicle wheel (3) in such a way that the vehicle wheel (3) can be brought into rolling contact with the inner circumferential surface (11a) of the drum (11);

(c) a vertical or radial loading device (9) which, in order to apply a vertical or radial force acting in the vertical or radial direction of the vehicle wheel (3) onto the mounting device (6), is connected with the mounting device;

(d) a lateral or axial loading device (10) for applying a lateral or axial force acting in the lateral or axial direction of the vehicle wheel (3), in order to apply the lateral or axial force onto the mounting device (6), the lateral or axial loading device being connected with the mounting device;

(e) at least one ring located on the inner circumferential surface of the drum (11), which ring is arranged as a thrust ring (15) adjacent to the tire and the side of the vehicle wheel (3) and is beveled on the side turned toward the tire (1); and (f) a device (12 to 14) for turning the drum (11);
(g) the vertical or radial loading device (9) and the lateral or axial loading device (10) each being connectively hinged with the mounting device (6); wherein,
  (i) the mounting device is mounted capable of moving in such a way the vehicle wheel can be pivoted around the wheel contact point for automatic camber adjustment;
  (ii) the mounting device includes a mount (8*a*) for at least one vehicle wheel wherein said mount is attached via one-sided attachment to the mounting device; and
  (iii) the thrust ring (15) has a shape which is matched to the conditions of tires (1) for durability tests with the least possible wear, the thrust ring (15) comprising:
    (a) an early, relatively steep leading edge (39);
    (b) a flat middle edge (40) opposed to this;
    (c) a relatively steep end edge (41); and
    (d) a rounding on the inner projection (42).

2. The device in accordance with claim 1, wherein mount (8*a*) is attached to a hinged loading bracket (8*b*).

3. The device in accordance with claim 1, further comprising an attachment device (19*a*) for a disk brake (19) for a vehicle wheel (3) in or on the mount (8*a*).

4. The device in accordance with claim 1 wherein the diameter of the drum (11) is such that a loading of the motorcycle wheel (3) in conditions similar to operating conditions at the wheel contact point (3*a*) is possible.

5. The device in accordance with claim 1, wherein an inner drum (43) is provided for fatigue strength testing of an original brake (19) by simulation of braking forces ($F_B$) with a relatively large angle of grip.

6. The device in accordance with claim 1, wherein the vehicle wheel (3) has an axle (7) having ends (7*a*, 7*b*) and is mounted on both ends of the axle (7*a*, 7*b*) to the mount (8*a*).

* * * * *